United States Patent [19]
De Wolf et al.

[11] Patent Number: 6,043,882
[45] Date of Patent: Mar. 28, 2000

[54] EMISSION MICROSCOPE AND METHOD FOR CONTINUOUS WAVELENGTH SPECTROSCOPY

[75] Inventors: Ingrid De Wolf; Mahmoud Rasras, both of Leuven, Belgium

[73] Assignee: IMEC vzw, Leuven, Belgium

[21] Appl. No.: 09/166,011

[22] Filed: Oct. 2, 1998

[51] Int. Cl.[7] .............................. G01J 3/14; G01N 21/88
[52] U.S. Cl. ........................................ 356/326; 356/237.1
[58] Field of Search .................................. 356/300, 326, 356/328, 73, 237.1

[56] References Cited

U.S. PATENT DOCUMENTS

| | | |
|---|---|---|
| 5,006,717 | 4/1991 | Tsutsu et al. . |
| 5,112,125 | 5/1992 | Neumann ................................. 356/328 |
| 5,320,830 | 6/1994 | Lukacovic et al. . |
| 5,550,375 | 8/1996 | Peters et al. ............................. 356/440 |
| 5,569,920 | 10/1996 | Phang et al. . |
| 5,724,131 | 3/1998 | Chim et al. . |

OTHER PUBLICATIONS

Kees deKort and Paul Damink, "The spectroscopic signature of light emitted by integrated circuits," Proc. ESREF, pp. 45–52, 1990.

*Primary Examiner*—F. L. Evans
*Attorney, Agent, or Firm*—McDonnell Boehnen Hulbert & Berghoff

[57] ABSTRACT

A photon-emission microscope method and system are described which allow both emission spot localization and continuous spectral analysis of the emited light from the emission spot of a biased electronic circuit. The system includes an emission microscope, a detector and an in-line, direct vision, chromatically dispersing prismatic device. The microscope system advantageously uses only one detector which does not need to be moved to be able to detect both the localization and spectral images. In a particular embodiment, localization of emission spots may be performed using monochromatic light which allows sharp images of the electronic circuit despite the fact that the electronic circuit is viewed through the dispersing device. Further, an improved procedure is described for overcoming errors caused by saturation of the detector at high sensitivities.

29 Claims, 8 Drawing Sheets

EMISSION MICROSCOPE AND METHOD FOR CONTINUOUS WAVELENGTH SPECTROSCOPY

The present invention relates to microscope systems for continuous wavelength spectroscopy as well as a methods of operating the same, in particular to photon-emission microscopes and microscopy. The microscope systems and methods are particularly useful in analyzing faults in electronic integrated circuits, particularly very large integrated circuits.

TECHNICAL BACKGROUND

Photon-emission microscopy is commonly used to localize failures in electronic integrated circuits. The technique detects light emitted from defects and failed elements when a device under test (DUT) is biased. Because the resolution of photon-emission microscopy is at best about 1 micron, localization of a defect is not usually sufficient to determine the cause of the failure or which element of a device has failed. Spectral analysis of the emitted light is of interest because it can provide additional information on the failure cause and place.

A simple method of carrying out a spectral analysis of the emitted light is to use a series of narrow bandpass filters— each filter being used to examine a narrow wavelength interval of the spectrum. Such systems are described in U.S. Pat. No. 5,006,717 and U.S. Pat. No. 5,320,830. However, a disadvantage with filters is their relatively low transmittance and the resulting low light levels and long acquisition times for capturing the spectrum during which the DUT is biased and may deteriorate further. In addition filters only provide spectral analysis at discrete wavelengths.

An improved technique which is capable of analyzing continuous spectra is described in U.S. Pat. No. 5,569,920 and U.S. Pat. No. 5,724,131. The known method uses a first detector for directly viewing the DUT and for localization of an emission. For spectral analysis, a high efficiency semi-ellipsoid mirror is placed directly above the DUT to collect the emitted light. The light collected by the mirror is coupled through an optical fiber to a grating monochromator connected to a photomultiplier. This system requires two detectors and in the case where more than one emission spot is present on the DUT all the light from the emission spots will be collected and overlapping of their spectra cannot be avoided. Further, placing any item such as the mirror close to the DUT limits the types of DUT which can be examined. For example, if the DUT is an integrated circuit on a wafer (not yet packaged) the mirror may mechanically interfere with the needle probes required to feed power to the DUT. Further, placing the mirror between the microscope objective lenses and the DUT places a limitation on the objective lenses and how close they can work to the DUT.

Another microscope system is known from the article by Kees de Kort and Paul Damink, "The spectroscopic signature of light emitted by integrated circuits", Proc. ESREF, pp. 45–52, 1990 and makes use of a beam splitter, a prism and a focusing lens. This method also requires two detectors which is a disadvantage, one for normal viewing and a second one for detecting the light split by the beam splitter towards the monochromator prism and lens. Also, the already weak light emitted from the biased DUT is partially lost in the beam splitter.

AIM OF THE INVENTION

It is an object of the present invention to provide a photon emission microscope system and method which provides analysis of continuous spectra and which has a simpler construction and is more cost effective.

It is a further object of the present invention to provide a photon-emission microscope system and method in which the reduction of image intensity by the optical components of the system is a minimum.

It is still a further object of the present invention to provide a photon emission microscope system and method which provides reliable and reproducible spectral any of light reflected by or emitted from the DUT.

It is still a further object of the present invention to provide a photo-emission microscope system and method which can discriminate between spectra of different emission sites on the same DUT.

SUMMARY OF THE INVENTION

The present invention provides a microscope system for evaluating the continuous spectral composition of light from a device under test (DUT), comprising:

a microscope;

a detector for detecting light received in the microscope from the DUT;

a dispersing prismatic device having a first position in which it is located between the DUT and the detector so that the light received by the detector which originates from the DUT is chromatically dispersed, the dispersing prismatic device being movable from the first position to a second position out of the path of light received by the detector from the DUT. Preferably, a single detector is used and this is not moved or altered as the prismatic device is moved from the second to the first position or vice versa The present invention also includes a microscope system for evaluating the continuous spectral composition of light from a device under test (DUT), comprising:

a microscope;

a detector for detecting light received in the microscope from the DUT;

a dispersing prismatic device having a first position in which it is located between the DUT and the detector so that the light received by the detector which originates from the DUT is chromatically dispersed; and a substantially monochromatic light source for observing the image of the DUT in the detector through the dispersing prismatic device when it is in its first position. The dispersing prismatic device in each of the above two microscope systems is preferably an Amici or roof prism operated in a direct vision way.

The present invention also provides a method for determining the continuous spectral composition of light emitted from a DUT, comprising the steps of:

setting the DUT on a stage of a microscope;

observing the image of light originating from the DUT with a detector;

changing the relative position between the detector and the DUT so that it spot to be observed on the DUT is aligned with a predetermined position in the detector;

moving a dispersing prismatic device into the path of light from the DUT to the detector; and recording the spectrally dispersed image of the spot through the dispersing prismatic device.

The present invention also provides a method for determining the continuous spectral composition of light emitted from a DUT, comprising the steps of:

setting the DUT on a stage of a microscope;

observing the DUT through the microscope and a dispersing prismatic device with a detector using a substantially monochromatic light;

changing the relative position between the detector and the DUT so that a spot on the DUT is aligned with a predetermined position on the detector;

removing the monochromatic light; and recording a spectrally dispersed image of the spot in the detector through the dispersing prismatic device.

The novel systems and methods can be implemented with only one detector for both conventional failure analysis and continuous wavelength spectroscopy. The emission spot location may be determined while the system is functioning in a first configuration with the detector at a down position. Then the detector is lifted by a mechanical system to a certain height such that a monochromator (dispersing prism/lens) can be inserted directly between the detector and an objective lens of the microscope.

The dependent claims define further individual embodiments of the present invention. The present invention, its advantages and embodiments will now be described with reference to the following drawings.

DESCRIPTION OF THE ILLUSTRATIVE EMBODIMENTS

The present invention will be described with reference to certain embodiments and to certain drawings but the invention is not limited thereto but only by the claims.

Figure 1:
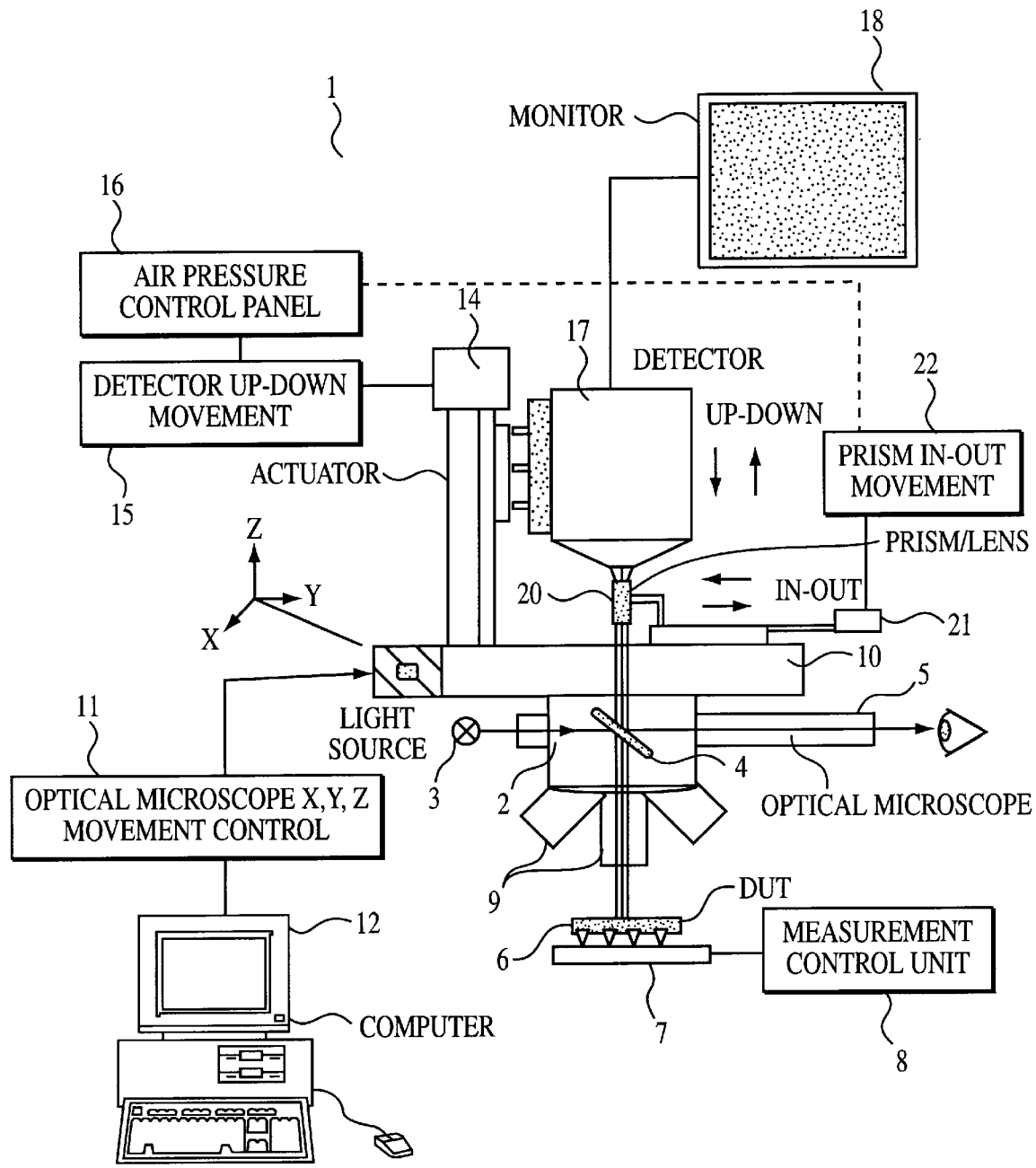
FIG. 1 is a schematic cross-sectional front view representation of a photon-emission microscope system in accordance with a first embodiment of the present invention.
Figure 3:
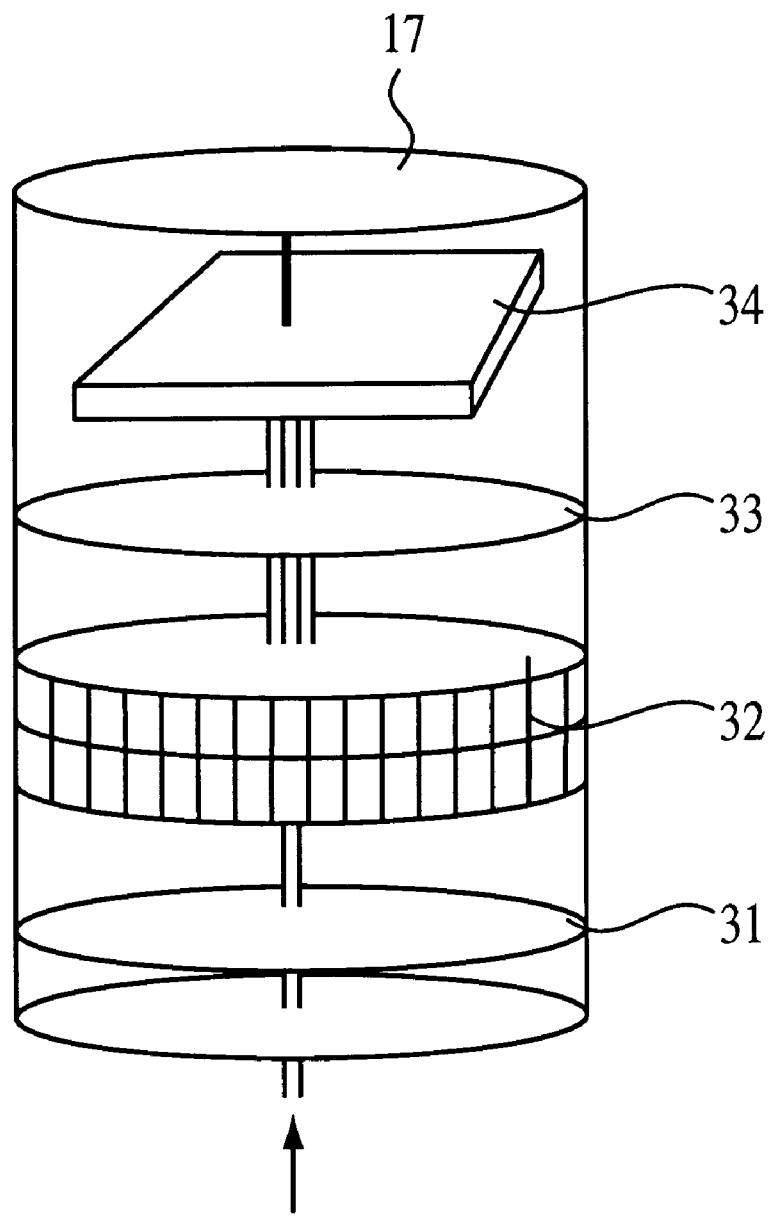
FIG. 3 is a schematic cross-sectional representation of one type of detector which may be used with the microscope system of FIG. 1.

FIG. 1 is a schematic view of the microscope system 1 in accordance with a first embodiment of the present invention. System 1 is composed of a conventional photo-emission microscope 2 (e.g. Visionary II supplied by Hypervision Inc., Fremont, Calif., USA) equipped with a highly sensitive detector 17 to which a novel high resolution spectroscopic part 20 with continuous wavelength capability is added. The detector 17 may be either an analog or digital detector, i.e. the detector 17 may be a photo-camera for recording the image from the microscope on a photographic film or may be a digital reproduction device capable of recording and optionally displaying the image on a suitable display screen 18. The light emitted from biased integrated circuits is very low and analog recording methods even with ultra-fast film may be too slow. Hence, it is preferred to use an image intensifier which may increase the brightness by a factor of 10,000 to 1 million or more. Image intensifier tubes can detect radiation in both the visible and near infra-red. Particularly preferred is a GENIII-NIR detector which is composed of a photo intensifier 31, 32, 33 coupled to a Charge Coupled Device (CCD) 34 (FIG. 3) which makes it sensitive in a relatively wide spectral range in the visible and near infrared region (from about 500 nm up to 1000 nm) but the present invention is not limited thereto. The photo intensifier may include a photocathode 31, a microchannel plate 32 and a phosphor screen 33. An advantage of the GENIII camera is its capability for semi-real-time imaging (at 0.1 sec. time intervals). A coded CCD detector can also be used which provides a larger spectral range (500–1100 nm) but a slower rate of capturing an image. Due to the low level of light from the DUT 6 it is preferred if the image received by the detector 17 is digitally processed to enhance its accuracy. For example, the image may be integrated over a period of time which may be done in an image processing computer in which noise levels my also be reduced by digital processing.

The detector 17 is mounted on top of an optical microscope 2 that preferably uses long working distance NIR objective lenses 9. The whole system 1 is attached to an X-Y-Z scanning probe station 10 to allow a scan over the entire DUT 6. The position of the probe station 10 may be controlled by a controller 11 which receives its position data from a personal computer 12 controlled, for instance, from a suitable input device such as a joy-stick The DUT 6 may be an electronic circuit which may be fed with suitable AC and/or DC voltages or currents from a measurement control unit 8. Where the electronic device is a packaged integrated circuit there will usually be leads attached to the device through which the biasing voltages or currents may be fed. However, the system 1 of the present invention may also accommodate non-packaged substrates such as an integrated circuit on a wafer for which needle probes are required in order to make electrical contact with the elements of the device. The purpose of feeding current or voltage to the DUT 6 is to activate the circuits and to cause light to emit from failures in the DUT 6. The microscope 2 may include a light source 3 and a beam splitter or half-silvered mirror 4 for illuminating the DUT 6. Optionally, an eyepiece 5 may be provided for viewing the DUT 6 by eye.

In the system 1, the detector 17 is mounted on a vertical (z direction), air-pressure controlled actor 14 that allows the detector 17 to slide up and down. An additional actuator 21 is used to give a smooth in-out movement of the monochromator 20 in between the detector 17 and the objective lens 9. Both movements are synchronized in such a way that the monochromator 20 can only be inserted if the detector 17 is in the up-position, and that the detector 17 can only go down if the monochromator 20 is moved out. The detector movement is controlled by an air pressure controller 16 based on an input from a suitable position sensor 15 for detecting the limit positions of detector 17. The controller 16 also controls the air pressure to a monochromator Movement controller 22 which controls an activator 21 for inserting and with-drawing the monochromator 20. The invention includes alternative actuators 14, 21.

Figure 2:
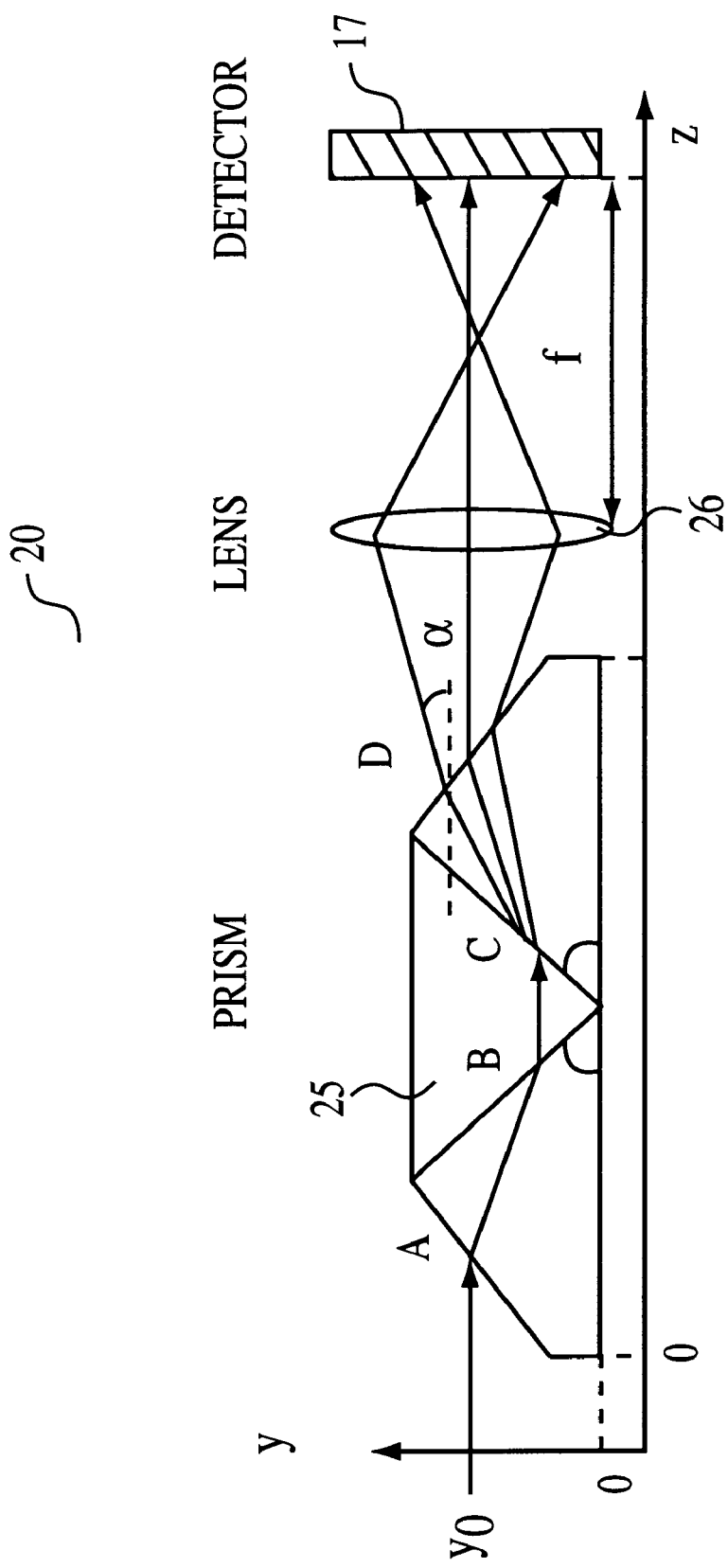
FIG. 2 is a schematic cross-sectional side view representation of a chromatic dispersing device for use in the microscope system shown in FIG. 1.

As shown schematically in FIG. 2 the monochromator 20 may be composed of a chromatically dispersing device 24 preferably coupled to a focusing lens 26. The dispersing device 24 is preferably a prismatic device 25 such as a direct vision dispersing prism. As an alternative or in addition to the lens 26, a pin-hole may be placed before the dispersing device 24 thus creating a small aperture through which is easy to focus the DUT 6 on the detector 17. A pin-hole has the disadvantage that it may reduce light intensity considerably. Prismatic device 25 is preferably a type of prism sometimes known as an Amici prism or roof prism. In this kind of prism a combination of several prisms (typically three, see FIG. 2), are placed together in series, the prisms being made of different glass materials such as flint glass and crown glass having different dispersion. With three prisms there are two sloping faxes, two parallel faces one lager than the other and two parallel faces of the same we. In such a prism, light with a certain wavelength, $\lambda_0$, passes through first sloping face of the prism 25 it exits from the other sloping face without deviation. The value of $\lambda_0$ depends on the composition and geometry of the prism 25. Light with different wavelengths $\lambda$, which differ from $\lambda_0$, will pass through this prism 25 (point D) with a certain angular deviation ($\alpha$) which depends on the wavelength: $\alpha(\lambda)$. Depending on $\alpha$, fight with wavelength $\lambda$ will be focused by the lens 26 at different positions (i.e. pixels) $p_x$ on the detector 17. So, a light emitting spot on a DUT 6, which would be imaged as a spot on the detector 17 in a conventional emission microscope, is projected by the monochromator 20 as a line on the detector 17. The light intensity at a certain point (pixel) on this line is due to the intensity provided by the corresponding wavelength band $\Delta\lambda$. Hence, the intensity versus distance along line graph can be transformed to a intensity/wavelength relationship. The spectral resoltion of the system 1 is given by the inverse of the number of wavelengths per pixel: $\partial\lambda/\partial p_y$. A Rayleigh prism may also be used for the chromatically dispersing device 25 but this is less preferred as it is not a direct vision prism, i.e. the path of light entering the prism is not substantially parallel to the light emerging from the prism. Use of a Rayleigh prism may require movement of the detector 17 (or two detectors 17) to receive the light emerging from the prism 25 which is not a preferred alternative of the present invention.

Figure 6:
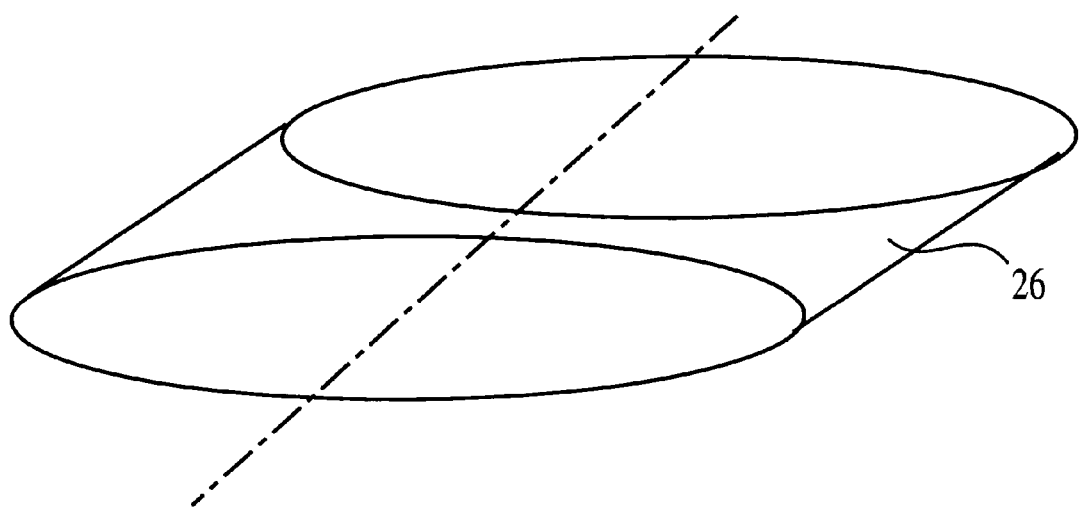
FIG. 6 is a schematic representation of a lens suitable for use with a prismatic dispersing device according to the present invention.
Figure 7:
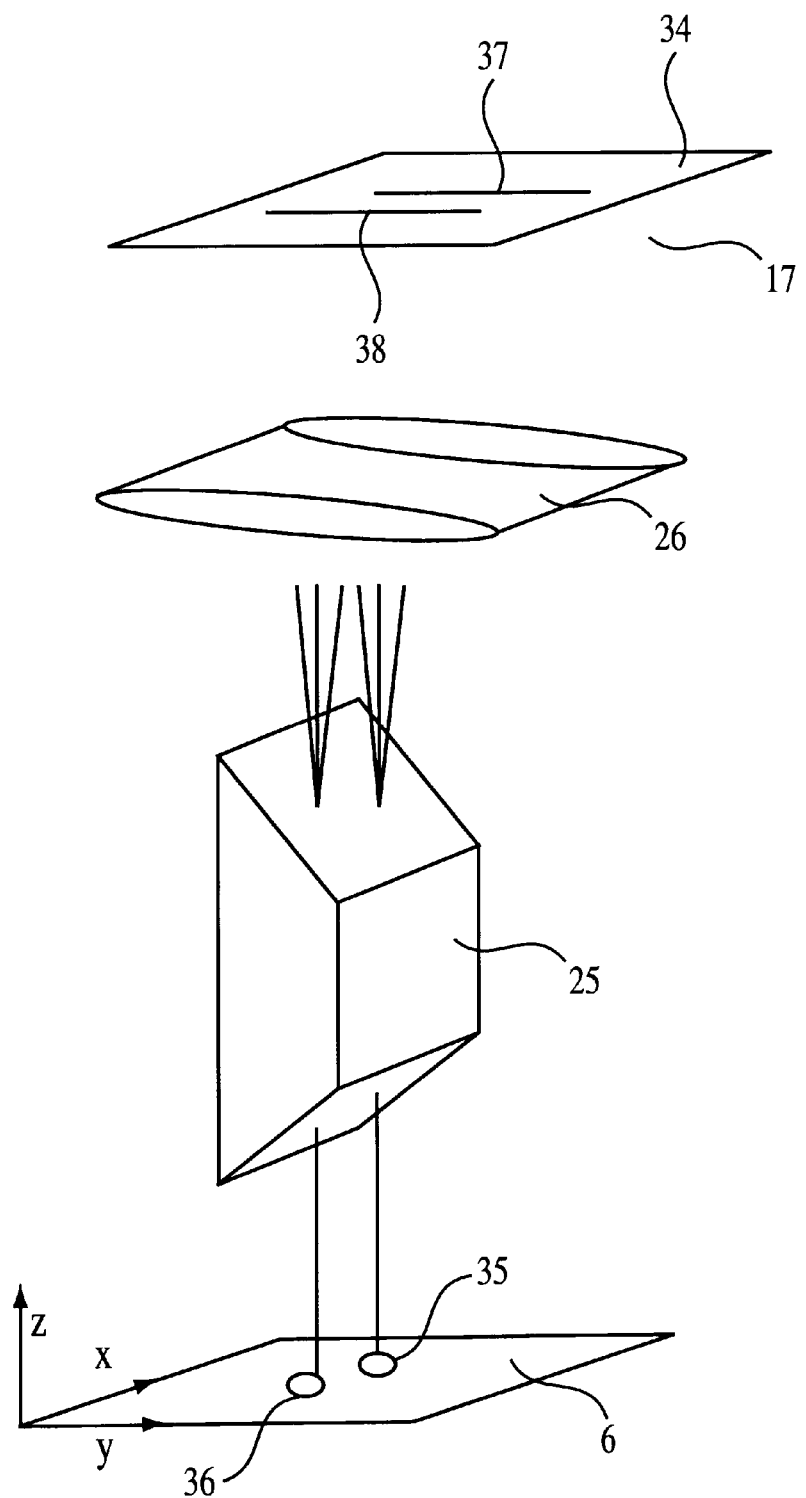
FIG. 7 is a schematic representation of the emissions from two spots on a DUT passing through the optics of a system in accordance with an embodiment of the present invention.

Lens 26 may be an achromatic lens, or a cylindrical lenticular lens or an achromatic cylindrical lenticular leans as shown schematically in FIG. 6 in cross-section. The axis of the cylinder should be placed parallel to the "x" direction of the detector 17 (see FIGS. 2 and 7). As shown schematically in FIG. 7 the light emissions from two spots 35 and 36 on the DUT 6 pass through the prism 25 and the light paths are spread chromatically. The spread beams are focused on the receiving plate 34 (e.g. the CCD) of the detector 17 by the lens 26. Because the lens 26 is cylindrical with its axis of symmetry through the cylinder parallel to the "x" direction, the dispersed spectral image of two emission spots 35, 36 separated in the "x" direction are resolved to two sharp speckle lines 37, 38. The chromatic resolution obtained by system 1 depends on the prism material and on the focal length, $f$, and diffraction limit of the lens 26. These parameters are preferably optimized to give a maximal coverage of the detector surface, and the best resolution.

Figure 4:
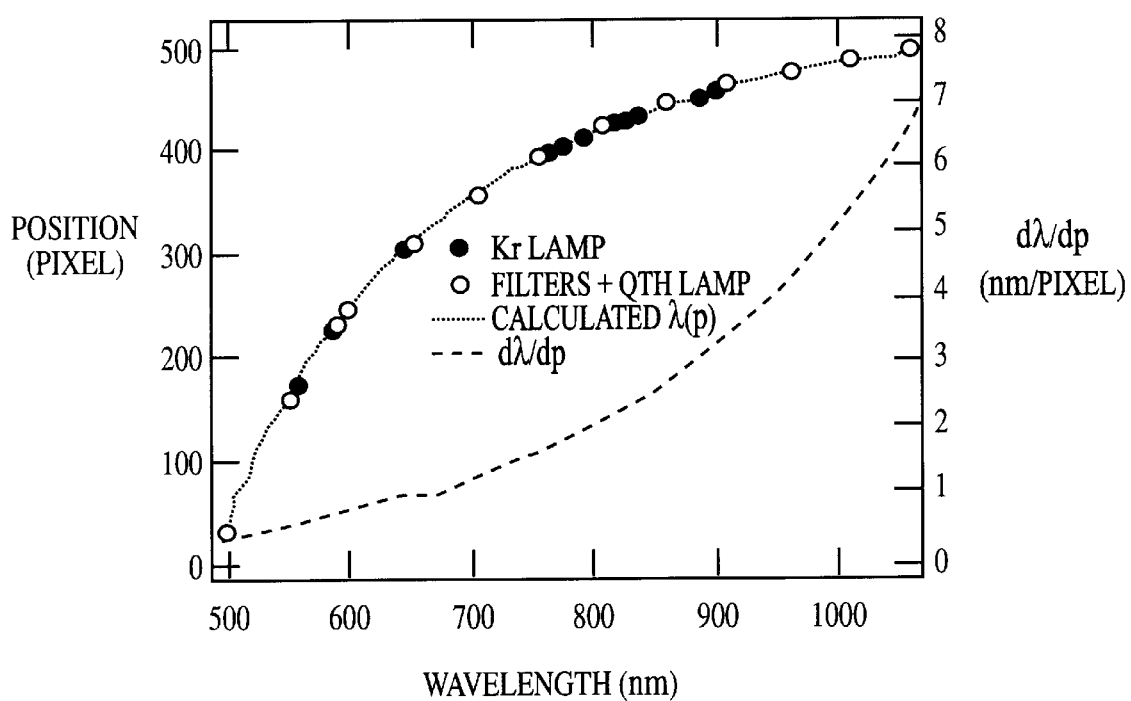
FIG. 4 is a diagram showing the position (as determined by pixel number $p_x$) in the detector when illuminating with a Krypton lamp (black circles), a QTH lamp (white circles) and as calculated (dotted line) as well as the inverse of the spectral resolution (dashed line) for the microscope system as shown in FIG. 1.

To calibrate system 1 and to measure its sped resolution, a spectrally calibrated Krypton lamp may be used. This type of lamp emits several discrete lines with wavelengths in the visible and the near infrared (NIR) region. The spectral image of this known lamp on the detector 17 may be used to relate pixel position to wavelength. In addition to these measurements, narrow band pass filters (pass band $\Delta\lambda$=10 nm) may be used to obtain monochromatic light from a Quartz Tungsten Halogen lamp (QTH). The wavelength range covered by a QTH lamp/filter combination is 500 nm up to 1050 nm. The results of these measurements using system 1 described above are shown in FIG. 4. The relation between wavelength and pixel on the detector 17 may also be calculated using the physical parameters of the prism 25 and the lens 26. The result of this calculation is shown by the dotted line in FIG. 4. An excellent agreement between measurements and calculation is obtained. FIG. 4 also shows the inverse of the spectral resolution ($\partial\lambda/\partial p_y$) of system 1 (dashed line). As can be seen from FIG. 4, the inverse of the resolution has a dependence on the wavelength. For wavelengths in the visible region, a good resolution is obtained, with a ($\partial\lambda/\partial p_y$=0.5 nm/pixel). However, in the near infrared region (NIR), the resolution is almost nine times less: ($\partial\lambda/\partial p_y$=4.5 nm/pixel). This difference has a strong influence on the sensitivity of system 1. Indeed, at shorter wavelengths the intensity of Light falling on the detector 17 will be distributed over a larger area on the detector 17, resulting in a smaller signal to noise ratio. From the above discussed experiments and calculations, the relation between the pixel number ($p_y$) and the wavelength ($\lambda$) for the system 1 is obtained. However, this curve will shift left or right on the detector 17 depending on the position $y_0$ (see FIG. 2), and therefore on the position of the monochromator 20 with respect to the detector 17. For this reason, it is preferred if every experiment is performed with the same value for $y_0$ and with the same position of the monochromator 20. This can be done by focusing the emission spot, without monochromator 20 every time, for each experiment at a predefined pixel ($p_x,p_y$) on the detector 17 called the reference position in accordance with this invention. To achieve this it is necessary to identify the spot to be measured as seen in the detector 17 and then manipulate the probe station 10 until this spot lies exactly at the reference position $p_x,p_y$ on the detector 17.

Once the system 1 is calibrated, the subsequent measurements should preferably be done under the same conditions, e.g. the same lateral position of the monochromator 20. The positioning of these components determines how good the correlation is between $\lambda$ and $p_y$. The mechanical positioning of system 1 in accordance with the present invention has a reproducibility within an accuracy of 1 $\mu$m.

The detector sensitivity is preferably calibrated. The intensity measured as a function of the wavelength, has also to be corrected for the wavelength dependence of the detector's sensitivity As the detector 17 is very sensitive, saturation of the detector at wavelengths where its sensitivity is highest may occur This effect may cause an incorrect interpretation of the whole spectrum, and consequently, invalidate the calibration data. An intensity calibrated Quartz Tungsten Halogen lamp (QTH) is preferably used to determine the wavelength dependence of the sensitivity of the detector 17.

During calibration, system 1 is preferably carefully shielded from undesired stray light reflected from the surroundings. Illumination of the detector 17 is carried out by passing the light from the QTH lamp through a diaphragm which is fixed to a hole on the shielding. By using a high reflection mirror mounted at 45°, light is reflected vertically into a pinhole that is directly positioned under the microscope's objectives 9. This set-up is chosen to avoid heating of the objectives 9 due to the lamp's temperature. This heating might damage the coating of the objectives 9. In addition, this set-up allows an easy control of the light intensity required to illuminate the detector 17 without getting local saturation. The sensitivity of the detector 17 may also be controlled by increasing or decreasing the number of frames per second (N) needed to record the image of the spectrum. For a further check on the calibration data obtained with the QTH lamp, calibration may also be performed using a spiral lamp for which the intensity as function of the wavelength has been calculated.

The spectral analysis of the emitted light from the emission site or from a failure is carried out by the following steps. First, the DUT 6 is biased to cause light emission from defects. Then the emission spot to be measured is localized while the detector 17 is in its down position. Then the by is preferably removed to prevent further damage to the DUT 6. Detector 17 is lifted while the monochromator 20 is left at its 'out' position. As soon as the detector 17 arrives at a certain predetermined height, the detector 17 is stopped at that position. Next, the microscope 2 is moved until the emission spot is displayed at the predetermined reference pixel position $p_x, p_y$ mentioned above. The monochromator 20 is inserted until it is situated in the optical path of the fight between the DUT 6 and the detector 17. Then, the biasing is switched back on and the spectral line image of the emission spot is focused an the detector 17 and the acquisition can start. The spectral line is recorded and the recorded intensity/position relationship along the line image is transformed into an intensity/wavelength diagram.

Figure 8A:
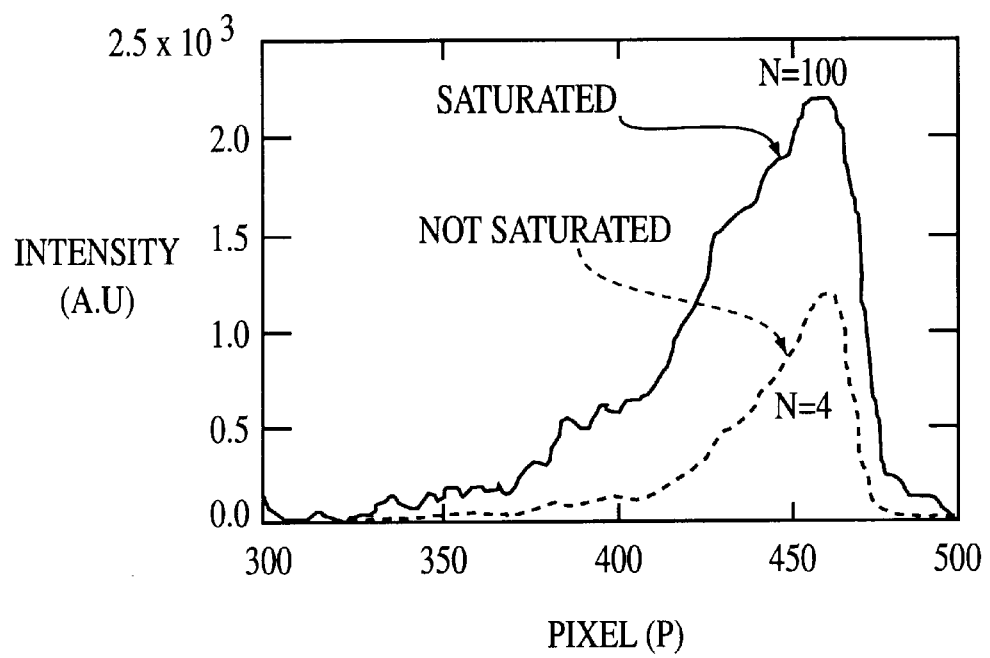
FIGS. 8A and 8B are position/intensity diagrams for saturated and non-saturated spectral images demonstrating how these may be combined to improve the sensitivity.
Figure 8B:
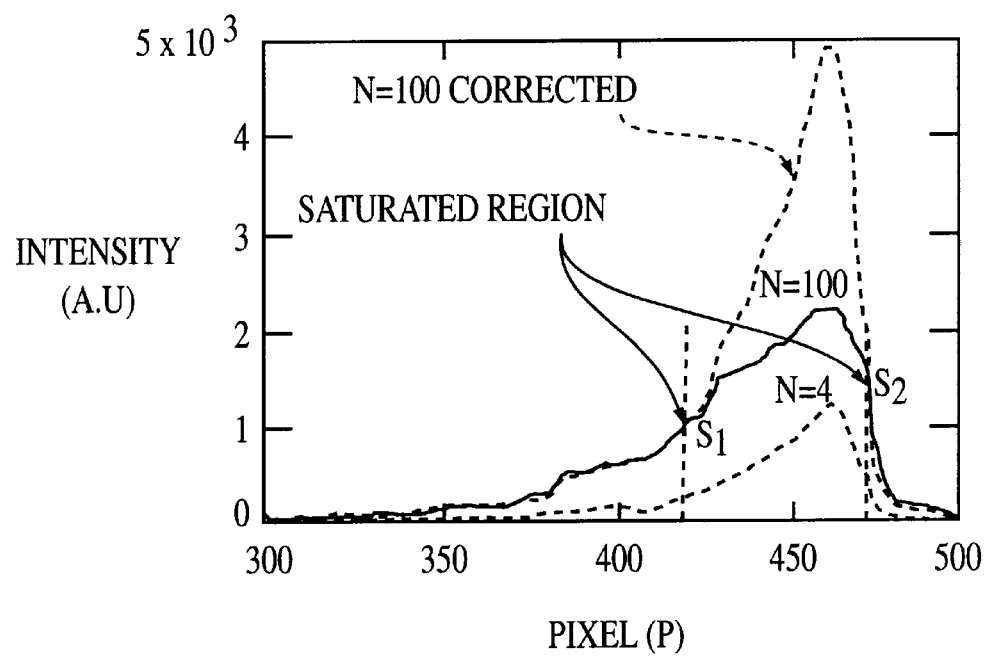

The total efficiency of detector 17 can be adjusted by changing the number of frames per second N during emission detection. For large N values, the detector is more sensitive and low emission intensities can be detected. However, for intense light emission, the detector may be saturated. In order to correct for saturation, a nonsaturated spectrum of the emission is imaged using a low N value, e.g N=4. Then the same spectrum is captured with a high N value, e.g. N=100. The two spectra are the normalized at their low ends where there is no saturation. Finally the saturated part of the spectrum with large N is replaced by the same part of the non-saturated spectrum normalized for the difference between the two. This procedure is shown in FIGS. 8A and 8B. In FIG. 8A the saturated and non-saturated spectral line images are shown in the form of a pixel (distance in the detector 17) intensity graph. The non-saturated spectra is adequate above about pixel number 430 in this case. In FIG. 8B the two positionintensity diagrams have been normalized based on the low pixel position region, i.e. so that this region has the same intensity for both the non-saturated and saturated spectral images. The saturated region between pixel 420 and 475 is replaced by the same region of the normalized no-saturated positionintensity diagram to form a complete diagram The emission microscope localization can also be performed with the detector 17 in its up position. The only effect of moving the detector 17 to a higher position is a slightly larger magnification compared to the down position. This means that a very easy and fast switching between emission spot localization (monochromator 20 out, detector 17 up) and emission spot spectroscopy (monochromator 20 in, detector 17 up) is possible. To obtain a graph of the intensity of the emitted light as a function of the wavelength, a rectangle is preferably defined surrounding the line spectral image on the detector 17. Next the intensity, I is calculated as a function of the horizontal pixel number, $p_y$. This may be done by calculating for each and every y position value, the sum of the intensities of all the pixels within the rectangle along the x direction. This procedure may result in a higher sensitivity than if the intensity would only be calculated for one pixel row ($p_x$ fixed). The measured intensity profile then has to be corrected for both spatial resolution and detector sensitivity. The following relation is used to carry out the transformation from the space (pixel) to wavelength dependence:

$$I(\lambda)=I(p_y)\times(\partial p_y/\partial\lambda)/\epsilon \quad (1)$$

where $\epsilon$ is the detector sensitivity obtained from the calibrated QTH lamp, and $I(\lambda)$ and $I(p_y)$ are the intensity as a function of wavelength and pixel position, respectively.

Figure 5:
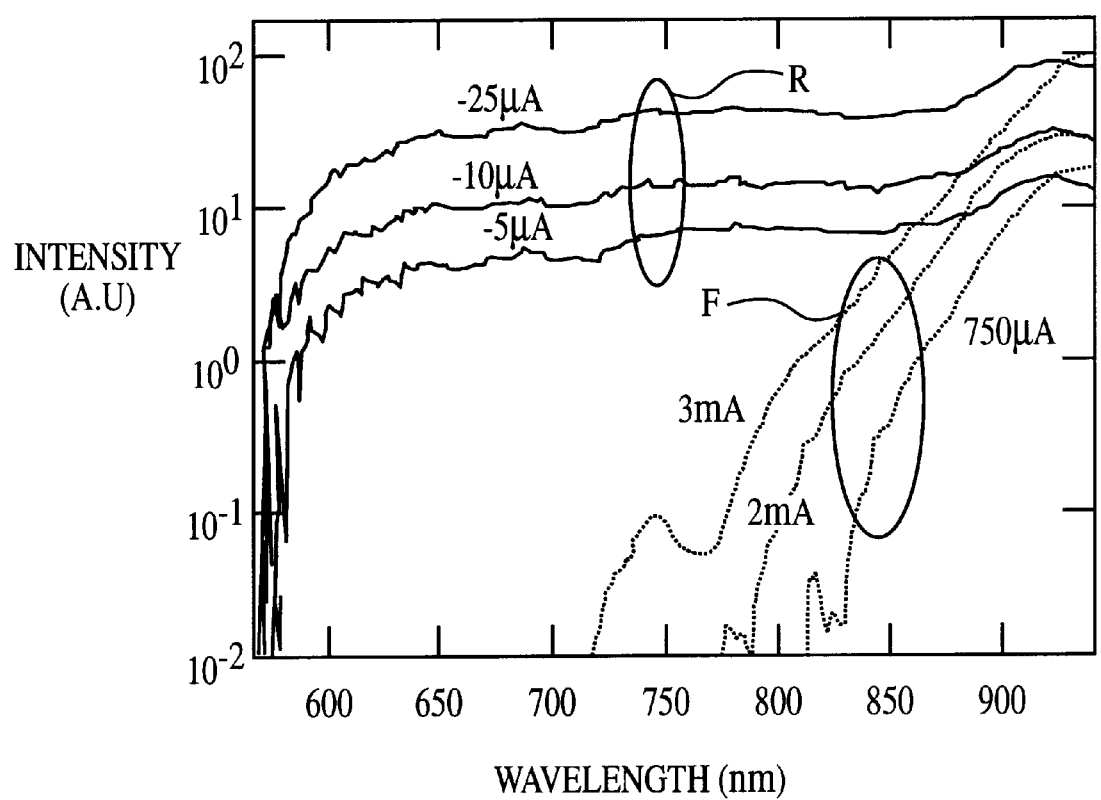
FIG. 5 is a diagram of emission spectra of a forward and reverse biased diode at different voltages determined with the microscope system according to FIG. 1.

FIG. 5 shows the emission spectra obtained for a p-α junction for different forward and reverse biased diode currents. These results demonstrate that spectra can be measured even for low emission intensities induced by small currents. This sensitivity is better than conventional systems. The spectral image obtained for the forward biased case appeared as a spot on the detector, while the reversed bias situation was characterized by a wide intensity band. This reveals immediately that emission for forward and reverse bias is caused by different physical mechanisms. FIG. 5 shows the spectra for forward biased diode currents of I=750 μA, 2 mA and 3 mA, and reverse biased diode currents of I=−5 μA,−10 μA and −25 μA after the required corrections of Eq. 1.

Certain aspects of the present invention may be derived form the above description. Firstly, a single detector 17 is used for both the location of features on the DUT 6 as well as the spectral analysis of the light emitted from such features thus reducing the cost of the complete installation. To achieve this, an in-line chromatic dispersing device is used whose input and output optical paths are substantially parallel so that it can simply be introduced between the DUT 6 and the detector 17 without the need for repositioning of the detector 17. This simplifies the calibration and positioning work which has to be done at each measurement and increases the reliability and repeatability of the measurements. Further, several light emitting spots on a DUT 6 appear as a series of lines on the detector 17 so that, with care, the spectral image of any desired emission spot can be selected from a plurality of spots in the field of view. If lines overlap or are too close together to be resolved they may usually be separated by rotating the microscope 2 with respect to the detector 17 so that the linear separation of the lines in the y direction increases or by changing to an objective lens 9 with higher magnification.

The microscope system 1 in accordance with the first embodiment has a spectral resolution determined by $\partial\lambda/\partial p_y$ but the accuracy of assigning a certain wavelength to a certain pixel position depends on determining the wavelength of the received light at a certain reference position in the detector 17 by calibration. Once the desired eon spot is localized in the detector 17 when it is in the up position it is assumed that introduction of the monochromator 20 does not affect the calibration of the system. In accordance with a second embodiment of the present invention the spectral calibration is checked in a simple manner at each measurement to confirm that introduction of the monochromator 20 does not introduce errors. The microscope system 1 in accordance with the second embodiment may be identical to that of the first embodiment except the light source 3 may have the capability of being switched from white light to a substantially monochromatic light, e.g. by introduction of a suitable filter between the light source 3 and the microscope 2 or by the use of a specific monochromatic light source such as a laser.

The method of operating system 1 in accordance with the second embodiment is as follows. The DUT 6 is observed with the detector 17 in the down position to roughly locate the emission spot to be measured. This may be done by observing the output of the detector 17 using the white light source 3 to illuminate the DUT 6 in order obtain a picture thereof Then the image of the DUT is observed without the white light source while the DUT is biased using the measurement and control unit 8. Once the emission spot is located, the DUT bias is preferably removed to avoid further damage to the DUT 6. The detector 17 is raised and the emission spot is again located in the field of view of the detector 17. If the mechanics of system 1 are good there should be little or no change of position of the spot location in the detector 17. The monochromator 20 is then moved into position so that it interrupts the light path from the DUT 6 to the detector 17, preferably without movement or adjustment of the detector 17. The light source 3 is now changed to monochromatic light. The image of the DUT 6 illuminated with the monochromatic light passes through the prism lens system 25, 26 as shown in FIG. 2 with a fixed deviation or with no deviation if the monochromatic light source has a wavelength of $\lambda_o$. Hence, the resumed image of the DUT 6 is sharp in detector 17. Now the emission spot location is moved to the reference position $p_x, p_y$ in the detector 17 by manipulating the station 10. When this has been done it is known that any light which is emitted from the DUT 6 which is recorded at the reference position $p_x, p_y$ has the same wavelength as the known wavelength of the monochromatic light. The monochromatic light source (e.g. white light source 3 with a filter which is not shown) is now switched off and the biasing switched back on. The acquisition of the spectral image of the tight emitted from DUT 6 is now preformed. The acquisition may include recording the image formed by background or stray lighting and subtracting this image from the image of the emission spot. After acquisition, the intensity/pixel position distribution is converted to an intensity/wavelength distribution as described for the previous embodiment taking into account that the reference position py on the detector 17 provides a reference point for the known wavelength of the monochromatic light. The present invention also includes that all localization can be done using a monochromatic light source 3, i.e. a white light source is optional.

This procedure in accordance with the second embodiment of the present invention provides a check of the wavelength of the light which falls on the known position $p_x, p_y$ in the detector 17 after all movements of the detector 17 and the monochromator 20 are complete. The acquisition of the spectral image of the desired emission spot can therefore be carried out using a measured valued for the wavelength of the light which falls at one position On the line image of the desired emission spot. From this one known and measured value and assuming that the spectral and intensity calibrations have been carried out accurately before the measurement, the procedure in accordance with the second embodiment guarantees very reliable and accurate estimations of the intensity/wavelength diagram.

While the invention has been shown and described with reference to preferred embodiments, it will be understood by those skilled in the art that various changes or modifications in form and detail may be made without departing from the scope and spirit of this invention as defined in the attached claims.

What we claim is:

1. A microscope system for evaluating the continuous spectral composition of light from a device under test (DUT), comprising:

a microscope;

a detector for detecting light received in the microscope from the DUT;

a dispersing prismatic device having a first position in which it is located between the DUT and the detector so that the light received by the detector which originates from the DUT is chromatically dispersed, the dispersing prismatic device being movable from the first position to a second position out of the path of light received by the detector from the DUT and wherein the dispersing prismatic device is a direct vision prismatic device.

2. The microscope system according to claim 1 wherein the direct vision prismatic device includes an Amici prism.

3. The microscope system according to claim 1, wherein the dispersing prismatic device includes a cylindrical focusing lens.

4. The microscope system according to claim 3, wherein the focus lens is a lenticular cylindrical lens.

5. The microscope system according to claim 3, wherein the cylindrical lens is arranged so that the spectral images of two emission spots on the DUT are simultaneously and individually focused at different positions in the detector.

6. The microscope system according to claim 1, further comprising a substantially monochromatic light source for observing the image of the DUT in the detector through the dispersing prismatic device when the prismatic device is in its first position.

7. A microscope system for evaluating the continuous spectral composition of light from a device under test (DUT), comprising:

a microscope;

a detector for detecting light received in the microscope from the DUT;

a dispersing prismatic device having a first position in which it is located between the DUT and the detector so that the light received by the detector which originates from the DUT is chromatically dispersed; and a substantially monochromatic light source for observing the image of the DUT in the detector through the dispersing prismatic device when it is in its first position.

8. The microscope system according to claim 7, wherein the dispersing prismatic device is a direct vision prismatic device.

9. The microscope system according to claim 8 wherein the direct vision prismatic device includes an Amici prism.

10. The microscope system according to claim 7, wherein the dispersing prismatic device includes a cylindrical focusing lens.

11. The microscope system according to claim 10, wherein the focusing lens is a lenticular cylindrical lens.

12. The microscope system according to claim 10, wherein the cylindrical lens is arranged so that the spectral images of two emission spots on the DUT are simultaneously and individually focused at different positions in the detector.

13. A method for determining the continuous spectral composition of light emitted from a DUT, comprising the steps of:

setting the DUT on a stage of a microscope;

observing the image of light originating from the DUT with a detector;

changing the relative position between the detector and the DUT so that an image of a spot location on the DUT is aligned with a predetermined position in the detector;

moving a dispersing prismatic device into the path of light from the DUT to the detector; and recording the spectrally dispersed image of the spot through the dispersing prismatic device.

14. The method according to claim 13, wherein the moving step and the recording step are carried out without changing the position of the detector substantially.

15. The method according to claim 13, further comprising the step between the observing and changing steps of observing the DUT in the detector using substantially monochromatic light.

16. The method according to claim 13, wherein the dispersing prismatic device is a direct vision prismatic device.

17. The method according to claim 16, wherein the direct vision prismatic device includes an Amici prism.

18. The method according to claim 13, wherein the dispersing prismatic device includes a cylindrical focusing lens.

19. The method according to claim 18, wherein the focusing lens is a lenticular cylindrical lens.

20. The method according to claim 13, further comprising the steps of:

localizing two emission spots on the DUT in the observing step; and focusing both emission spots in the detector simultaneously at two different positions.

21. The method according to claim 13, wherein the recording step includes:

recording the spectrally dispersed image at high detector sensitivity to form a first line image;

recording the spectrally dispersed image at a low detector sensitivity to form a second line image; and normalizing the first and second line images for low intensity values; and combining the low intensity values from the first line image with the normalized high intensity values from the second line image.

22. The method according to claim 21, wherein the spectrally dispersed image of the first line image is saturated at long wavelengths, the spectrally dispersed image of the second line image is not saturated, and the combining step is carried out to improve the efficiency at short wavelengths.

23. A method for determining the continuous spectral composition of light emitted from a DUT, comprising the steps of:

setting the DUT on a stage of a microscope;

observing the DUT through the microscope and a dispersing prismatic device with a detector using a substantially monochromatic light;

changing the relative position between the detector and the DUT so that an image of a spot location on the DUT is aligned with a predetermined position on the detector;

removing the monochromatic light; and recording a spectrally dispersed image of the spot in the detector through the dispersing prismatic device.

24. The method according to claim 23, wherein the moving step and the recording step are carried out without changing the position of the detector substantially.

25. The method according to claim 23, wherein the dispersing prismatic device is a direct vision prismatic device.

26. The method according to claim 25, wherein the direct vision prismatic device includes an Amici prism.

27. The method according to claim 23, wherein the dispersing prismatic device includes a cylindrical focusing lens.

28. The method according to claim 27, wherein the focusing lens is a lenticular cylindrical lens.

29. The method according to claim 23, wherein the recording step includes:

recording the spectrally dispersed image at high detector sensitivity to form a first line image;

recording the spectrally dispersed image at a low detector sensitivity to form a second line image; and normalizing the first and second line images for low intensity values; and combining the low intensity values from the first line image with the normalized high intensity values from the second line image.

* * * * *